3,729,464
BIS CYANOPYRAZOLYL ALKANES AND BIS CYANOCYCLOPROPYL ALKANES

Jerome Robert Olechowski, Trenton, N.J., assignor to Cities Service Company, New York, N.Y.
No Drawing. Filed Aug. 27, 1971, Ser. No. 175,726
Int. Cl. C07d 49/02
U.S. Cl. 260—310      4 Claims

ABSTRACT OF THE DISCLOSURE

Diazoalkanes are reacted with acrylonitriles to obtain cyanopyrazolyl alkanes which are oxidized or photolyzed to cyanocyclopropyl alkanes. The cyanocyclopropyl alkane is cleaved by catalytic hydrogenation to obtain the aliphatic amine.

In one embodiment, bis-diazohexane is reacted with acrylonitrile to obtain bis (cyanopyrazolyl) hexane which, in turn, is oxidized to bis (cyanocyclopropyl) butane. The bis (cyanocyclopropyl) butane is cleaved by catalytic hydrogenation and 1,12-diaminododecane is obtained. These compounds are useful in the manufacture of polyamide resins.

---

The present invention relates to novel compositions comprising cyanopyrazolyl compounds, especially bis (cyanopyrazolyl) aliphatic hydrocarbons, and cyanocyclopropyl compounds, especially bis (cyanocyclopropyl) aliphatic hydrocarbons. The invention also relates to a method for the manufacture of amines, especially alpha-omega aliphatic amines, from said cyanocyclopropyl compounds such as bis (cyanocyclopropyl) aliphatic hydrocarbons.

The objects of the present invention are to provide novel compositions. Another object of the invention is to provide novel compositions which are useful in the manufacture of polyamide resins. An additional object of the invention is to provide a novel process for obtaining the aforementioned compositions.

These and other objects are obtained according to the present invention in which novel cyanopyrazolyl compounds, especially bis (cyanopyrazolyl) aliphatic hydrocarbons and cyanocyclopropyl compounds, especially bis (cyanocyclopropyl) aliphatic hydrocarbons are obtained and whereby the cyanocyclopropyl compounds, especially bis (cyanocyclopropyl) aliphatic hydrocarbons are catalytically hydrogenated to cleave the (cyanocyclopropyl) moiety to give an amine such as an alpha-omega aliphatic diamine.

Diazo aliphatic hydrocarbons such as bis-diazo aliphatic hydrocarbons are employed in the present invention to obtain the novel cyanopyrazolyl compounds. These diazo aliphatic hydrocarbons are represented as follows:

(I)      $R(CH_2N_2)_x$ where $x$ is 1 or 2 and is especially 2 and where the radical R is an organic radical and may contain up to 12 carbon atoms, especially up to 6 carbon atoms. The most preferred radical R in this respect comprises the foregoing radicals which are further free from any organic or inorganic substitutes and preferably comprises a saturated aliphatic hydrocarbon radical.

The diazoalkane is reacted in a lower alkane or lower dialkyl ether solvent with an acrylonitrile, such as acrylonitrile per se or the alpha-alkyl substituted acrylonitriles, such as methacrylonitrile, ethacrylonitrile and the like to obtain the cyanopyrazolyl alkane, especially the bis (cyanopyrazolyl) alkane. Acrylonitrile is preferred in this respect. Diethyl ether is used as a solvent and the acrylonitrile is added to the diazo compound at from about −20° C. to about 5° C. with cooling. The reaction is conducted in an open beaker at atmospheric pressure; however, pressures above or below atmospheric may be employed such as from about 0.75 to about 2 atmospheres. The ether or solvent is allowed to evaporate and the cyanopyrazolyl compound is obtained as a solid on the bottom of the beaker. The reaction proceeds according to the following:

(II)
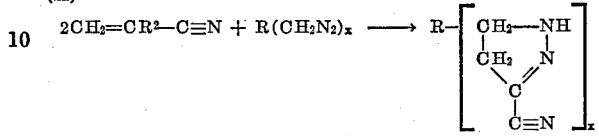

where the radicals R and $x$ have been defined previously in (I) and $R^2$ is lower alkyl or hydrogen.

The resultant cyanopyrazolyl alkane is then oxidized by lead acetate [Pb(OAc)₄] or other equivalent oxidation catalysts known in the art or photolyzed to give the cyanocyclopropyl alkanes such as the bis (cyanocyclopropyl) alkanes according to the following:

(III)
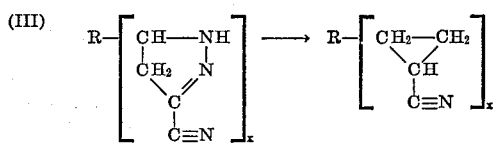

where the radicals R and $x$ are defined in (I) above. Any equivalent tetravalent lead salt may be used such as the lead formates, propionates and the like. Any ultraviolet source may be employed for the photolytic oxidation, such as daylight or an equivalent source of visible light or by using a medium pressure, low pressure or high pressure mercury vapor lamp. The reaction is conducted by dissolving the cyanopyrazolyl in methylene chloride and the lead acetate in methylene chloride and combining the two solutions thus obtained. The reaction is conducted and maintained at a temperature from about 10° C. to about 15° C. at atmospheric pressure or pressure sufficient to allow the mixture to reflux. Refluxing of the mixed solutions is conducted and continued for a length of time until gas evolution ceases after which the cyanocyclopropyl compound is obtained.

The cyanocyclopropyl alkane as defined above is then cleaved by catalytic hydrogenation to give the amino alkane such as for example the alpha, omega-diaminoalkane. The hydrogenation reaction is conducted catalytically by employing a hydrogenation or reduction catalyst known in the art, such as nickel, especially finely divided nickel, such as Raney nickel at temperatures from about 90° to about 125° C. and at pressures from about 500 to about 1500 p.s.i.g. The hydrogenation or reduction is also conducted in the presence of a nitrogen compound such as ammonia and hydrogen or any compounds that will form hydrogen and ammonia at the reaction conditions employed in the reduction without adversely affecting the reduction. Hydrogen and ammonia, however, are generally used and may be employed with a so-called inert gas, such as nitrogen or one of the rare gases, helium, neon, krypton, argon and xenon, or any combination thereof. The reduction reaction is illustrated as follows:

(IV)
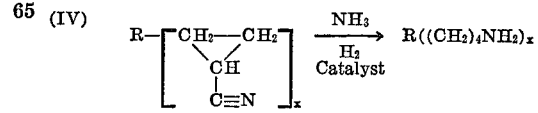

where the radicals R and $x$ are defined previously in (I).
The following examples are illustrative.

EXAMPLE 1

Bis-diazohexane is reacted with 2 mols of acrylonitrile in an ethyl ether solvent at −5° C. in an open beaker and bis (cyanopyrazolyl) hexane is obtained.

The bis (cyanopyrazolyl) hexane in methylene chloride is then oxidized by a solution of lead acetate [Pb(OAc)]$_4$ in methylene chloride at 4° C. under reflux until gas evolution stops to obtain bis (cyanocyclopropyl) hexane and the cyanocyclopropyl moiety thereof is then cleaved by catalytic hydrogenation. The hydrogenation is conducted at 1500 p.s.i.g., 125° C. in the presence of hydrogen, a nickel catalyst and 2 mols of ammonia (NH$_3$) per mol of bis (cyanocyclopropyl) butane to obtain 1,12-diaminohexane.

When the foregoing method of Example 1 is repeated employing bis-diazopropane and bis-diazobutane, similar reactions occur to produce 1,9-diaminononane and 1,10-diaminodecane.

The amines obtained according to the process of the present invention are converted to polyamides by reaction with dicarboxylic acids, such as adipic acid, terephthalic acid, and the like. In particular, 1,12-dodecanediamine is used in the preparation of Quiana (trade name) type polyamides. Additionally, diisocyanates are prepared from these diamines by reaction with a carbonyl halide, such as phosgene by methods known in the art. The diisocyanates are converted to polyurethanes by reaction with a polyether polyol.

When all the foregoing equivalent reaction conditions and compounds described are employed in any combination the same general results are obtained as noted herein. Several of the equivalent conditions and compounds have been described broadly by reference to a range of temperatures, pressures and times; carbon atoms contained in the compounds by which it is intended that such ranges are to include specific values between the upper and the lower limits thereof as well as narrower ranges within the broad range disclosed. Thus, for example, where the temperature range is given broadly for cleaving the cyanocyclopropyl compound by hydrogenation as within the limits of from about 90° C. to about 125° C., any specific value, e.g., 98° C., 100° C., 105.5° C., etc., falling within this range is also intended as well as a narrower range within this broad range, e.g. 100° C.–115° C. Furthermore, where the radical R for example has been described, preferably as one containing up to 12 carbon atoms, it is intended to include those radicals which can be described by a narrower range falling within the up to 12 carbon atom limitation, such as radicals having from 6 to 12 carbon atoms, 8 to 10 carbon atoms and so forth for the other numerical ranges used to define the various equivalent reaction conditions, compounds and radicals.

Although the invention has been described by reference to one or more embodiments it is not intended that the broad scope of the novel method and products obtained from such method be limited thereby, but that modifications are intended to be included within the broad spirit and broad scope of the foregoing disclosure and the following claims.

What is claimed is:

1. A compound corresponding to the formula:

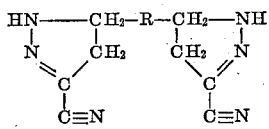

wherein R is saturated aliphatic hydrocarbon of up to 12 carbon atoms.

2. The compound of claim 1 wherein R is of four carbon atoms.

3. A compound corresponding to the formula:

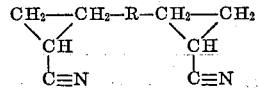

wherein R is saturated aliphatic hydrocarbon of up to about 12 carbon atoms.

4. The compound of claim 3 wherein R is of four carbon atoms.

References Cited

FOREIGN PATENTS 234,280    6/1961    Australia _____ 260—310 R

OTHER REFERENCES

Rodd, E. H.: Rodd's Chemistry of Carbon Compounds, vol. I, Part B, p. 160.

Bergman, R. G.: J. Amer. Chem. Soc., vol. 91, p. 7405.

HENRY R. JILES, Primary Examiner

M. CROWDER, Assistant Examiner

U.S. Cl. X.R.

260—78, 453 PH, 464, 583 R, 858